Oct. 18, 1932.  J. P. BILLINGSLEY ET AL  1,883,498
BRAKE
Filed Nov. 11, 1930  2 Sheets-Sheet 1
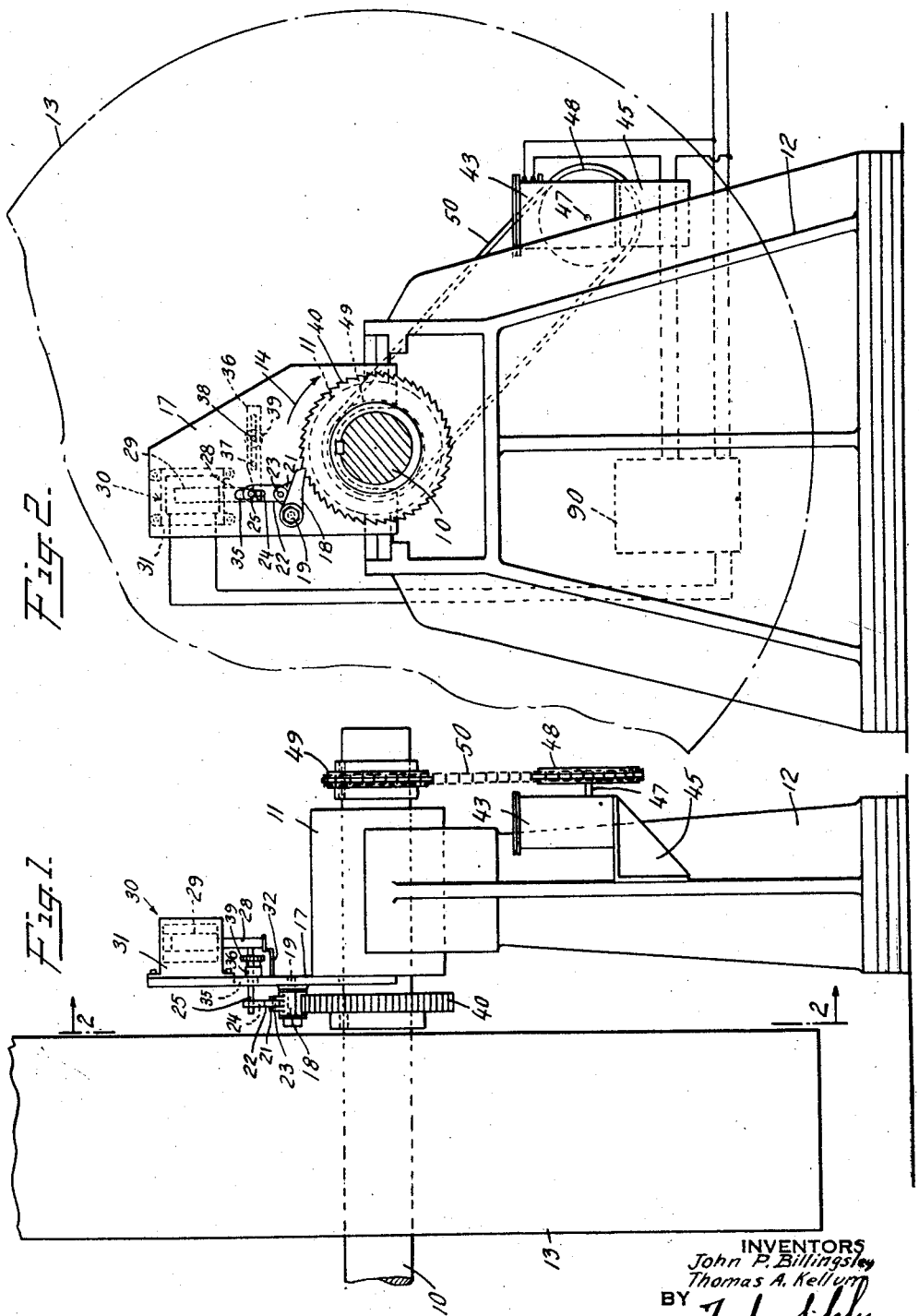
INVENTORS
John P. Billingsley
Thomas A. Kellum
BY
ATTORNEY Oct. 18, 1932.          J. P. BILLINGSLEY ET AL          1,883,498
                              BRAKE
                   Filed Nov. 11, 1930      2 Sheets-Sheet 2
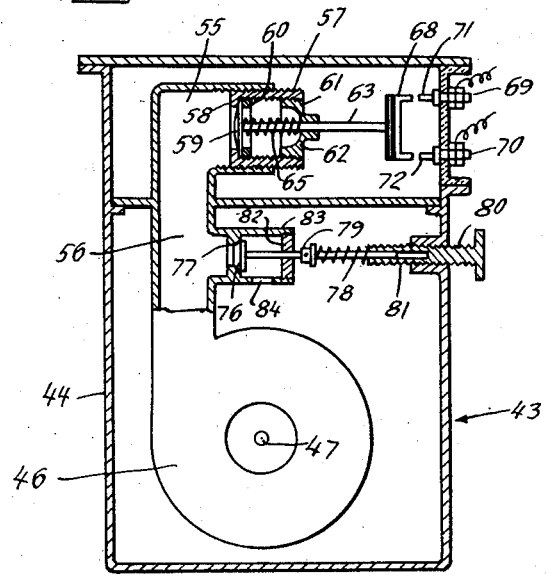
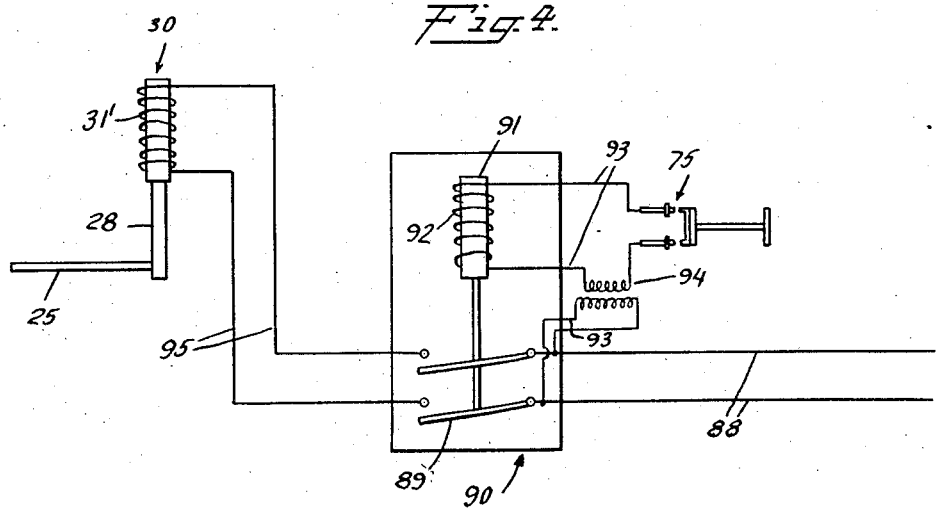
INVENTORS
John P. Billingsley
Thomas A. Kellum
BY
ATTORNEY Patented Oct. 18, 1932

1,883,498

UNITED STATES PATENT OFFICE

JOHN P. BILLINGSLEY, OF WILMINGTON, AND THOMAS A. KELLUM, OF CLAYMONT, DELAWARE, ASSIGNORS TO GENERAL CHEMICAL COMPANY, OF NEW YORK, N. Y., A CORPORATION OF NEW YORK

BRAKE

Application filed November 11, 1930. Serial No. 494,875.

This invention is directed to brakes and more particularly to braking devices adapted for use in connection with pumps and blowers.

Although the invention is of general application with respect to many different types of blowers, pumps and other mechanisms, to facilitate the presentation of one specific embodiment, the invention will be described in conjunction with gas blowers such as those disclosed in U. S. patents to Green 859,762 and 859,763, and Hassler 1,696,882.

Blowers of the type described in these patents include generally a pair of parallel shafts carrying mated lobed impellers arranged for rotation in a compression chamber having an inlet and an outlet affording connections with the inlet and outlet gas mains. Synchonized rotation of the impellers is effected by timing gears mounted on and keyed to the shafts outside the impeller chamber. The blower is driven by a suitable prime mover connected to one of the shafts.

Blowers or pumps of this general description are usually employed in plants requiring the circulation of large quantities of gas at comparatively low pressures, say around 15 pounds per square inch. In large installations, the outlet sides of a number of such blowers are connected to a common outlet header or main conducting the gas under pressure to the point of utilization. It will be appreciated that blowers of the type referred to are of large dimensions and capacity, and for this reason, although a given plant may include a number of blowers, each blower is, as a general rule, driven by a separate prime mover.

In plant practice, it often happens that for some reason or other, the motive power for one or more of the blowers will fail, thus throwing the dependent blower or blowers out of operation. However, the gas pressure in the outlet header or main will be substantially sustained by the other pumps still operating. When such a condition arises, the gas in the outlet header backs up against the impeller of the blower which has ceased to be driven, and because of the back pressure in the outlet header, acts on the impellers to reverse the rotation of the blower. As each pump or blower under normal conditions is working against the pressure in the outlet header, it will be apparent that, in case of failure of power, the affected blower will almost instantaneously cease movement in the direction in which it is normally rotated by the driving power, and commence to revolve in the opposite direction. This reverse rotation is started so quickly that even though the failure of the prime mover is immediately observed by the operator, there is insufficient time to close the heavy main valves between the blower and the outlet header before the impeller, rotating in the reverse direction, acquires such momentum as to cause serious damage to the machine.

The principal object of the present invention lies in the provision of a brake which operates automatically to prevent reversing of a blower or pump working against a fluid pressure maintained in a conduit or header into which the blower normally discharges when, for any reason, there is a failure in the motive power driving the pumping apparatus. The invention further aims to provide a brake mechanism which is maintained in an inoperative position when the machine with which it is associated is being driven at normal speeds in the direction of its normal movement, and which is caused to be moved into operative position when the speed of the machine falls below a predetermined rate, and which functions on cessation of the movement of the machine in the normal direction to instantly prevent any reverse movement or operation of such machine. The invention is further directed to the provision of simple mechanism so constructed that there is a constant tendency of the brake to become operative by its own action together with a brake control mechanism, the actuation of which is governed by the rate of movement of the machine with which the brake is associated. The invention also includes details and refinements of construction which altogether cooperate to provide a braking mechanism which automatically and positively comes into action when the conditions therefor arise and accomplish the purpose set forth.

Briefly, the invention comprises a brake, associated with a shaft adapted to rotate in one direction to drive a pump, constructed so that the brake of its own action normally tends to become and remain effective, together with mechanism maintaining the brake inoperative when the drive shaft is being rotated at a predetermined rate in the driving direction, and automatically acting when the shaft is rotated at less than a predetermined rate in the driving direction to permit the brake to become effective to prevent rotation of the shaft in the opposite direction.

The invention accordingly comprises the feature of construction, combination of elements and arrangement of parts, which will be exemplified in the embodiment set forth in the following description taken in connection with the accompanying drawings in which Fig. 1 is a side elevation of a brake mechanism, together with so much of the associated blower or pump as is necessary for an understanding of the invention;

Fig. 2 is a vertical section approximately on the line 2—2 of Fig. 1;

Fig. 3 is an enlarged vertical section showing the details of an hydraulic relay, and Fig. 4 is a schematic diagram of an electrical circuit including control switches.

Referring to Fig. 1 of the drawings, the reference numeral 10 indicates one portion of the drive shaft or operating element of a pump or blower comprising the drive shaft, a parallel countershaft geared thereto, such shafts carrying mated lobed impellers rotating in a compression chamber having an inlet and an outlet arranged for connection to inlet and outlet headers or conduits. The end of the shaft 10 is supported by and rotates in the outboard bearing 11 mounted in the pedestal 12. Power is transmitted to the blower from a prime mover not shown through the pulley 13 keyed to the shaft 10. Further description of the blower is unnecessary for the reason that the construction and operation of such blowers are well known as indicated, for example, by the patents above mentioned. During the operation of the blower, power is transmitted to the shaft 10 through the pulley 13 in such manner as to cause the shaft to rotate in the direction of the arrow 14, Fig. 2. The pressure side of the blower is connected to a header or conduit which serves as an outlet header for one or more blowers connected thereto and in which the gas or other fluid therein is constantly under pressure. It will appear that this condition is such that on failure of the prime mover, the gas pressure in the header acts to cause the impellers to revolve in the opposite direction, and if such reverse rotation is permitted in a very short time interval, the pump will acquire such high momentum that the machine is likely to destroy itself, or in any event, cause serious damage.

A brake mechanism, constituting one embodiment of the present invention, for preventing reversing of the blower is shown principally in Figs. 1 and 2 of the drawings. The steel supporting plate 17 is bolted or otherwise suitably attached to the inner end of the housing of the bearing 11. A gravity actuated pawl or fall arm 18 is pivotally mounted on a stub shaft 19 set into and projecting rearwardly from the supporting plate 17. Integrally formed with the body of the pawl 18 is an upwardly projecting yoke 21 to which the lower end of a link 22 is pivotally connected by a short pin 23. An elongated slot 24, Fig. 2, is cut in the upper end of the link 22, thus affording a sliding connection between the link 22 and the end of a rod 25 extending through the slot. The end of rod 25 is rigidly set into and projects horizontally from the lower end of an arm 28 fixed to the lower end of a core 29 of a solenoid indicated generally at 30. The solenoid 30, the wiring connections and the depending arm 28 are all suitably mounted in a casing or box 31 bolted to the supporting plate 17. A small bracket 32 projects forwardly from the plate 17, and is so positioned as to provide a support for the arm 28 when the coil of the solenoid is de-energized and the core of the solenoid and the attached arm 28 are in their lowermost position.

Referring to Fig. 1, it will be seen that the rod 25 which transmits motion from the arm 28 to the link 22 projects through the plate 17. The plate 17 is provided with a vertically disposed slot 35 which permits upward and downward movement of the rod 25 in consonance with the motion of the arm 28.

An elongated slotted arm 36, Fig. 2, is mounted for horizontal movement on pins 37 and 38 projecting forwardly from the plate 17. As shown on the drawings, one end of the arm 36 is wedge-shaped, and for all adjustments of the arm 36, is disposed beneath rod 25. When the arm 36 is in the position shown in Fig. 2, the inclined upper edge on the end of the arm is out of contact with the underside of the rod 25, thus permitting full upward and downward movement of the latter. Where it is desired for any reason to secure the pawl 18 in a raised position, the arm 36 is moved to the left, Fig. 2, and the inclined surface on the end of the arm engages the underside of rod 25 and raises and maintains the same in an elevated position. The arm 36 may be locked in any desired position by thumb nut 39 threaded onto the pin 38.

The ratchet wheel 40 is keyed to the shaft 10.

It will be apparent from the foregoing description that when the coil of the solenoid is de-energized and the arm 28 is in its lowermost position, the free end of the pawl engages the teeth on the ratchet wheel 40. Under these conditions it will appear that the vertical slot 24 in the link 22 permits sufficient upward movement of the pawl 18 to allow the free end of the pawl to click over the teeth of the ratchet wheel when the latter rotates in the direction of the arrow 14 and that when the shaft ceases to rotate in such direction the pawl immediately falls behind one of the teeth on the ratchet and prevents counter-rotation of the shaft.

The mechanism for regulating the action of the solenoid 30 comprises an electrical circuit including a relay switch and a line switch, the operation of which is controlled by a hydraulic relay, indicated generally at 43, connected to the shaft 10. Fig. 3 illustrates a vertical section of the hydraulic relay and the relay switch associated therewith. Casing 44 is supported by bracket 45 bolted or otherwise attached to the pedestal 12. A small centrifugal pump 46 is suitably supported in the casing 44 in the position shown in the drawings. The shaft 47 of the pump projects through one side of the casing 44, and carries on its outer end a pulley 48. A similar pulley 49 is keyed to the end of the shaft 10, and rotation of the latter is transmitted to the pulley 48 through a belt connection 50.

The outlet side of the pump communicates with a chamber 55 formed on the upper end of a connecting conduit 56. The cylindrical end of the casting forming the chamber 55 is internally threaded so as to receive an externally and internally threaded sleeve 57 having on its inner end an annular flange 58. Seated against one face of the flange 58 is a flexible diaphragm 59 held in fluid-tight relation thereto by an externally threaded ring 60. A second externally threaded ring 61, provided with an outwardly projecting yoke 62, affords a sliding support for a stem 63, the inner end of which is attached to the center of the flexible diaphragm 59. Encircling the inner end of the stem 63 is a light spring 65 bearing at one end against the diaphragm 59 and at the other end against the inner side of the yoke 62. A U-shaped, vertically disposed conductor 68 is insulated from and mounted on the outer end of the stem 63. Terminal posts 69 and 70 are set into the upper end of the casing 44 in alignment with the projecting ends of the conductor 68 and are insulated from the casing in any suitable manner. The inner ends of the terminal posts 69 and 70 are provided with contacts 71 and 72 adapted to engage the conductor 68 when the latter is urged to the right by pressure exerted on the diaphragm 59. The contacts 71 and 72 and the conductor 68 together constitute what may be designated as a relay switch indicated generally by the reference numeral 75.

A relief valve is positioned in the conduit 56 between the pump and the chamber 55. Valve 76 is adapted to rest against the valve seat 77, and is normally held in this position by the spring 78 encircling the other end of the valve stem, bearing at one end against the collar 79 pinned to the valve stem, and at the other end against the face of an adjusting screw 80 threaded into the wall of the casing 44. The screw 80 includes a longitudinal bore 81 receiving and supporting the end of the valve stem and permitting a limited longitudinal movement thereof regardless of the adjustment of the screw 80. The inner end of the valve stem is slidably supported by a disc 82 threaded into the outer end of the cylindrical valve casing 83. A port 84 is provided in the lower side of the casing 83 to permit return of liquid from the casing 83 to the reservoir receptacle 44.

Conductors 88 are connected across a main power line, and terminate at one side of a line switch 89 mounted on a control panel attached to the pedestal 12 and indicated generally at 90. The line switch 89 is opened and closed by a solenoid having a core 91 connected to the movable terminals of switch 89, and a coil 92 in a circuit 93 which includes the relay switch 75, a suitable step-down transformer 94 and is connected across the conductors 88. Conductors 95 terminate in the panel 90, and include the coil 31' of the solenoid 30, and are electrically connected to the fixed terminals of the line switch 89. The panel 90 may be provided with a manually operated switch, not shown, for cutting off the main line 88 from the control mechanism described.

In operation, power for driving the blower connected to the shaft 10 is transmitted thereto through the pulley 13 in such manner that the shaft 10 rotates in the direction of the arrow 14, Fig. 2. The casing 44 of the hydraulic relay is filled with oil or other suitable liquid to a level substantially above the inlet of the pump 46. Motion of the shaft 10 is transmitted to the shaft 47 of the pump 46 through the pulleys 48 and 49 and the belting 50. Assuming that the arm 36 is locked in an inoperative position, and that the electrical circuit of the control mechanism is connected across the main power line, as the rotation of the main shaft 10 commences, the pump 46 withdraws oil from the reservoir in the bottom of the casing 44 and discharges the same into the conduit 56 and into the chamber 55 behind the flexible diaphragm 59. When the shaft 10 approaches normal speed, the pressure built up in the chamber 55 becomes sufficient to move the diaphragm 59 toward the right, Fig. 2, throwing the conductor 68 into engagement with the contacts 71 and 72, thus closing relay switch 75. The engagement of conductor 68 and contacts 71 and 72 closes the circuit through the conductors 93 and the coil 92 in the control panel 90. As the coil 92 is energized, the core 91 is drawn upwardly, and the line switch 89 is closed. Current is then transmitted from the conductors 88 through switch 89, conductors 95 and through the coil 31' of the solenoid 30. When the coil 31' is energized, the arm 28 is raised and the latter in turn lifts the pawl 18 away from the face of the ratchet wheel by means of the link 22 connecting the rod 25 with the yoke 21 on the pawl. It is thus apparent that during normal rotation of the shaft 10 in the direction of the arrow 14, the pawl 18 is held out of engagement with the teeth of the ratchet wheel, and the braking mechanism is maintained in an inoperative position.

The pressure built up in the chamber 55 may be regulated by adjustment of the screw 80. If the pressure in chamber 55 becomes greater than that necessary to overcome the action of the diaphragm and spring 65, the valve 76 opens and a small quantity of oil is by-passed back into the tank through the casing 83 and port 84.

In the event of the failure of the prime mover driving the pulley 13, the rate of rotation of the shaft 10 decreases and approaches zero. As soon as the rotation of the shaft 10 slows down below some predetermined rate such that the pressure maintained in the chamber 55 is insufficient to overcome diaphragm 59 and spring 65 and maintain the conductor 68 in engagement with the contacts 71 and 72, the flexible diaphragm, aided by the spring 65, moves the stem 63 to the left, Fig. 2, thus opening switch 75. The circuit through the conductors 93 is then broken, and the coil 92 is de-energized, permitting the core 91 to drop and open the line switch 89. When the switch 89 is opened, no current passes through the conductors 95, the coil 31' of the solenoid 30 is de-energized, and the arm 28 falls to its lowermost position, and rests on the supporting bracket 32. The dropping of the arm 28 effects a corresponding movement in the rod 25, and the pawl 18 is thus permitted to fall by its own weight into engagement with the teeth of the ratchet wheel 40. Accordingly, the instant rotation of the shaft 10 in the direction of the arrow 14 ceases, the pawl 18 immediately falls in behind one of the teeth in the ratchet 40, and prevents counter rotation of the shaft 10.

It will be apparent from a consideration of the foregoing description that the construction of the brake mechanism is such that under no circumstances can it interfere with the rotation of the shaft 10 in the proper direction, i. e., in the direction of the arrow 14. For example, if the prime mover is operating properly and, for some reason or other, the power in the line 88 goes off, the pawl 18 drops down onto the periphery of the ratchet, and because of the lost motion connecting link 22 clicks over the successive teeth as the rotation of the shaft continues. Obviously, the existence of this condition over an extended period of time would be undesirable because of the comparatively high speed of rotation of the shaft and the resulting rapid wear of the ratchet and pawl. Nevertheless, if such a condition arises, the brake does not interfere with the rotation of the shaft in the proper direction, but is instantly available to prevent any counter rotation of the shaft.

It will also be observed that the brake is self-acting and does not depend upon the presence of electrical energy in the line 88 to become effective. For example, where the prime mover is electrically driven from the same source supplying current to the line 88, if the main source of power fails, line 88 goes dead, and irrespective of the fluid pressure in chamber 55, and the opening of the relay switch 75, the pawl 18 immediately drops into operative position to prevent counter rotation the instant the shaft 10 stops. Hence, it will be apparent that the action of the brake does not depend upon some outside source of energy, such as current in the line 88, which itself is likely to fail.

Other specific forms of mechanism may be employed in place of those illustrated in the drawings and described in connection therewith. For example, the pawl 18 might readily be disposed in some position in which a spring might be utilized to urge the pawl into contact with the ratchet. The pawl and ratchet together might well be replaced by some other form of brake, and mechanism other than the hydraulic relay and the associated electrical connections for rendering the brake operative might be employed instead of those illustrated and described. For example, a Carpenter A. B. relay type E, No. 535, and a Cutler & Hammer type AAA-2 contact panel, both obtainable in the market may be employed in place of the hydraulic relay and contact panel disclosed herein.

The invention has also been disclosed in connection with a gas blower. The application of the invention is not limited thereto, but may be employed in connection with all forms of pumps and other mechanisms which operate under conditions tending to cause a reversal of movement on a failure of motive power, and the use of the term "blower" in the appended claims is intended to include all such mechanisms.

We claim:

1. The combination with a shaft normally rotatable in one direction of means for preventing rotation of the shaft in the opposite direction comprising a brake, electrically controlled means for maintaining the brake inoperative during normal rotation of the shaft, and means for rendering the brake operative on rotation of the shaft below a predetermined rate.

2. The combination with a shaft normally rotatable in one direction of means for preventing rotation of the shaft in the opposite direction comprising a brake including a pair of braking elements one of which is gravity actuated, electrically controlled means for maintaining the brake inoperative during normal rotation of the shaft, and means permitting actuation of the brake on rotation of the shaft below a predetermined rate.

3. In an apparatus of the character described, the combination with a blower connected to an operating element normally movable in one direction to effect operation of the blower of a brake, electrically controlled means for maintaining the brake inoperative during normal movement of the operating element, and means for rendering the brake operative on movement of the operating element below a predetermined rate.

4. In an apparatus of the character described, the combination with a blower connected to an operating element normally movable in one direction to effect operation of the blower, of a brake, electrically controlled means including a switch for maintaining the brake inoperative during normal movement of the operating element, and means operating the switch on movement of the operating element below a predetermined rate for rendering the brake operative.

5. In an apparatus of the character described, the combination with a blower connected to an operating shaft normally rotatable in one direction to effect operation of the blower, of a brake, electrically controlled means for maintaining the brake inoperative during normal rotation of the shaft and means for rendering the brake operative on movement of the shaft below a predetermined rate.

6. In an apparatus of the character described, the combination with a blower connected to an operating shaft normally rotatable in one direction to effect operation of the blower, of a brake, electrically controlled means including a switch for maintaining the brake inoperative during normal rotation of the shaft, and means operating the switch on rotation of the shaft below a predetermined rate, for rendering the brake operative.

7. In an apparatus of the character described, the combination with a blower connected to an operating shaft normally rotatable in one direction to effect operation of the blower, of a gravity actuated brake, electrically controlled means including a switch for maintaining the brake inoperative during normal rotation of the shaft, and means associated with the switch for operating the same to permit actuation of the brake on rotation of the shaft below a predetermined rate.

8. In an apparatus of the character described, the combination with a blower connected to an operating shaft normally rotatable in one direction to effect operation of the blower, of a brake, electrically actuated means including a switch for controlling the brake, a pump connected to the shaft operating on normal rotation of the shaft to close the switch, and means to open the switch on rotation of the shaft below a predetermined rate.

9. In an apparatus of the character described, the combination with a blower connected to a shaft normally rotatable in one direction to effect operation of the blower of means for preventing rotation of the shaft in the opposite direction comprising a ratchet wheel keyed to the shaft, a pawl mounted on a fixed pivot, means for holding the pawl out of engagement with the ratchet during rotation of the shaft at a normal rate, and means operating on rotation of the shaft below a predetermined rate for engaging the pawl and ratchet.

10. In an apparatus of the character described, the combination with a blower connected to a shaft normally rotatable in one direction to effect operation of the blower of means for preventing rotation of the shaft in the opposite direction comprising a ratchet wheel keyed to the shaft, a pawl mounted on a fixed pivot, electrically controlled means including a switch for holding the pawl out of engagement with the ratchet, and means operating the switch on movement of the shaft below a predetermined rate for permitting engagement of the pawl and ratchet.

11. In an apparatus of the character described, the combination with a blower connected to a shaft normally rotatable in one direction to effect operation of the blower of a brake for preventing rotation of the shaft in the opposite direction, a solenoid operating when energized to maintain the brake inoperative, means for energizing the solenoid when the shaft rotates at a normal rate, and means for de-energizing the solenoid when the shaft rotates below a predetermined rate.

12. In an apparatus of the character described, the combination with a blower connected to a shaft normally rotatable in one direction to effect operation of the blower of means for preventing rotation of the shaft in the opposite direction comprising a ratchet wheel keyed to the shaft, a pawl mounted on a fixed pivot, a solenoid operating when energized to hold the pawl out of engagement with the ratchet, means for energizing the solenoid when the shaft rotates at a normal rate, and means for de-energizing the solenoid when the shaft rotates below a predetermined rate to permit engagement of the ratchet and pawl.

13. In an apparatus of the character described, the combination with a blower connected to a shaft normally rotatable in one direction to effect operation of the blower of means for preventing rotation of the shaft in the opposite direction comprising a ratchet wheel keyed to the shaft, a pawl mounted on a fixed pivot, a solenoid operating when energized to hold the pawl out of engagement with the ratchet, a circuit including a switch for energizing the solenoid, a pump connected to the shaft operating on normal rotation of the shaft to close the switch and energize the solenoid, and means to open the switch on rotation of the shaft below a predetermined rate.

14. In an apparatus of the character described, the combination with a blower connected to an operating element normally movable in one direction to effect operation of the blower of means for preventing movement of the operating element in the opposite direction comprising a pair of braking elements one of which elements is fixed to and movable with the blower operating element, and the second braking element being movable but fixed relative to the first-mentioned braking element, means for holding the second-mentioned braking element out of engagement with the first-mentioned braking element during normal movement of the blower operating element, and means acting on movement of the blower operating element below a predetermined rate for moving the second-mentioned braking element into engagement with the other braking element.

15. In an apparatus of the character described the combination with a blower connected to an operating element normally movable in one direction to effect operation of the blower of means for preventing movement of the operating element in the opposite direction comprising a pair of braking elements one of which elements is fixed to and movable with the blower operating element, and the second braking element being movable but fixed relative to the first-mentioned braking element, electrically controlled means for holding the second-mentioned brake element out of engagement with the first-mentioned braking element during normal movement of the blower operating element, and means acting on movement of the blower operating element below a predetermined rate for moving the second-mentioned braking element into engagement with the other braking element.

16. In an apparatus of the character described, the combination with a blower connected to a shaft normally rotatable in one direction to effect operation of the blower of means for preventing rotation of the shaft in the opposite direction comprising a ratchet wheel keyed to the shaft, a pawl mounted on a fixed pivot, electrically controlled means for holding the pawl out of engagement with the ratchet during rotation of the shaft at a normal rate, and means operating on rotation of the shaft below a predetermined rate for engaging the pawl and ratchet.

17. In an apparatus of the character described the combination with a blower connected to an operating element normally movable in one direction to effect operation of the blower of means for preventing movement of the operating element in the opposite direction comprising a pair of braking elements one of which elements is fixed to and movable with the blower operating element, and the second braking element being movable but fixed relative to the first-mentioned braking element, electrically controlled means including a switch for holding the second braking element out of engagement with the first-mentioned braking element during normal movement of the blower operating element, and means operating the switch on movement of the blower operating element below a predetermined rate for bringing said braking elements into engagement.

In witness whereof, we have hereunto set our hands.

JOHN P. BILLINGSLEY.
THOMAS A. KELLUM.